[11] 3,622,361

[72] Inventors John Denis Pennington
Bolton;
William Ian Hay Winning, Yarm-on-Tees, both of England
[21] Appl. No. 717,418
[22] Filed Mar. 29, 1968
[45] Patented Nov. 23, 1971
[73] Assignee Tac Construction Materials Ltd.
[32] Priority Mar. 29, 1967
[33] Great Britain
[31] 14,318/67

[54] PRODUCTION OF INSULATING COATINGS BY SPRAYING
8 Claims, No Drawings
[52] U.S. Cl. .................................................. 106/93,
106/90, 106/99, 106/105, 106/104, 106/108,
106/115, 106/119, 106/15 FP, 161/403, 252/8.1
[51] Int. Cl. ......................................................... C04b 31/06,
C04b 31/44
[50] Field of Search ............................................ 106/99, 97,
93, 90, 107, 108, 111, 115, 81, 84, 104; 252/8.1,
463; 161/403

[56] References Cited
UNITED STATES PATENTS

| | | | |
|---|---|---|---|
| 3,242,986 | 3/1966 | Hower............................ | 106/90 |
| 3,093,505 | 6/1963 | Conway.......................... | 106/90 |
| 2,815,293 | 12/1957 | Randall et al.................. | 106/97 |
| 2,644,771 | 7/1953 | Kempthorne................... | 106/99 |
| 2,633,433 | 3/1953 | Hollenberg..................... | 252/62 |
| 2,509,599 | 5/1950 | Hollenberg..................... | 106/99 |
| 2,438,339 | 3/1948 | Jacobs............................ | 161/163 |
| 1,920,358 | 8/1933 | Clark.............................. | 106/99 |
| 1,851,038 | 3/1932 | Clark.............................. | 106/285 |
| 803,285 | 10/1905 | Hayde............................ | 106/99 |

*Primary Examiner*—James E. Poer
*Assistant Examiner*—W. T. Scott
*Attorney*—Sughrue, Rothwell, Mion, Zinn & Macpeak

ABSTRACT: Compositions for forming insulating coatings by spraying mineral wool and fiber, cement or other binder and water are based on mineral wool, and include mineral oil and a surface-active agent or a cellulose ether.

PRODUCTION OF INSULATING COATINGS BY SPRAYING

The production of coatings on surfaces for the purpose of thermal or acoustic insulation or fire protection by spraying asbestos fiber and a binder is well known. Our object in this invention is to reduce the cost by replacing asbestos by mineral wool.

Mineral wool has indeed been used in admixture with asbestos, but it has not hitherto been feasible to use it as the sole fibrous component of the sprayed coating. The reason is that mineral wool does not possess the high capillarity of asbestos fiber and therefore does not cohere at the time when the coating is being formed. Some of the sprayed material falls to the ground.

In the spraying of any fiber to form an insulating coating it is necessary also to spray a binder or the constituents of a binder. The binder commonly used in the spraying of asbestos is cement, which is premixed with the asbestos and caused to set by water sprayed simultaneously. However, cement or any other powder binder does not adhere well to mineral wool, with the result that some of the binder is lost at the time of spraying and does not serve its purpose, and there is also a considerable amount of visible dust in the spray. It is of course important to prevent the production of dust, which is unpleasant to the operator and anyone else in the vicinity.

In forming a coating by spraying fiber, a powder binder and water onto a surface according to this invention, the fiber is mineral wool and the spray includes a mineral oil and a surface-active agent or a cellulose ether or both. We find that by the introduction of the oil and the surface-active agent or cellulose ether the presence of visible dust in the spray can be virtually eliminated, the cohesion at the time of spraying is adequate to prevent the sprayed material from falling to the ground, and the adhesion of the sprayed coating to the surface is good.

Mineral wool may be produced from metallurgical slag or from rock, and either kind may be used in the invention. Whatever its origin, the main chemical constituents in percentage by weight are from 25 to 50 percent $SiO_2$, 3 to 20 percent $Al_2O_3$, 20 to 45 percent CaO and 3 to 18 percent MgO. The individual fibers commonly are from 2 to 10 microns in diameter and up to 1 inch in length, though the average length is from one-eighth to one-fourth inch. In the mixture which is sprayed the mineral wool is preferably present as tufts from three-eighths to three-fourths inch long.

The binder is preferably Portland cement or ciment fondu or a mixture of these, but may be based on magnesium oxychloride. magnesium oxysulfate, line, gypsum, clay, sodium silicate or potassium silicate. The mineral oil is preferably a clear fine oil. The surface-active agent is preferably nonionic or anionic, and we find that the best agents for the purpose are the sodium salts of alkylated naphthalene sulfonic acid; the condensation products of alkyl phenol and ethylene oxide; and anhydrous condensation products of a long-chain fatty alcohol and ethylene oxide. Of the cellulose ethers methyl hydroxypropyl cellulose is particularly suitable.

The invention includes as a novel composition for use in a spraying process the mixture of mineral wool, binder and mineral oil. In preparing this composition, the mineral oil may advantageously be introduced into a mixture of the mineral wool and binder by spraying either into a drum mixer in which the mineral wool and binder are mixed or into a feeder to which the mineral wool and binder are continuously fed and so mixed in appropriate proportions. In either case the mixture may advantageously be passed through an opening machine having rotating blades to break down the mass of wool into tufts and to increase the uniformity of the mixture.

The surface-active agent or cellulose ether can be sprayed with the water, but preferably is included in the composition with the mineral wool, binder and mineral oil, Either the surface-active agent or the cellulose ether can be added as a powder during the mixing referred to above or to the remaining constituents of the composition immediately before the spraying. However, it is preferred to introduce the surface-active agent or cellulose ether at an earlier stage in the preparation of the composition, namely by spraying it within a chamber in which the mineral wool fibers are being made from slag or rock.

The proportions of the composition may vary widely but preferably are as follows in percent by weight:

| | |
|---|---|
| binder | 10 to 40% |
| mineral oil | 0.25 to 3.0% |
| surface-active agent or cellulose ether or both | 0.01 to 3.0% |
| mineral wool | the remainder |

One example of proportions is as %

| | |
|---|---|
| mineral wool | 78.35% |
| Portland-cement | 20% |
| mineral oil | 1.5% |
| sodium salts of alkylated naphthalene sulfonic acid. | 0.15% |

We claim:

1. A sprayable, settable composition for use in forming a coating upon being set by water consisting essentially of from 10 to 40 percent of an inorganic, water-settable powder binder selected from the group consisting of Portland cement, ciment fondu, a mixture of Portland cement and ciment fondu, magnesium oxychloride, magnesium oxysulfate, lime, gypsum and clay, from 0.25 to 3 percent of a mineral oil and from 0.01 to 3 percent of at least one compound selected from the group consisting of anionic surface-active agents, nonionic surface-active agents and cellulose ethers, the balance of said composition being mineral wool tufts, all percents being by weight, said composition yielding substantially no visible dust upon spraying and providing good cohesion prior to the setting of said binder and good adhesion to the surface upon which it is coated.

2. A composition according to claim 1 in which the binder is Portland cement.

3. The composition of claim 1 wherein said surface active agent is selected from the group consisting of the sodium salts of alkylated naphthalene sulfonic acid, the condensation products of alkyl phenol and ethylene oxide, and the anhydrous condensation products of a long-chain fatty alcohol and ethylene oxide.

4. The composition of claim 1 wherein said one compound is a cellulose ether.

5. The composition of claim 4 wherein said cellulose ether is methylhydroxypropyl cellulose.

6. The composition of claim 1 wherein said one compound is a surface-active agent.

7. In the preparation of a composition as claimed in claim 1, the step of introducing the mineral oil by spraying onto a mixture of the mineral wool and binder.

8. In the preparation of a composition as claimed in claim 1 the steps of producing mineral wool fibers from slag or rock and introducing at least one compound selected from the group consisting of surface-active agents and cellulose ethers into the mineral wool by spraying during the production of said fibers.

* * * * *